United States Patent Office 3,004,077
Patented Oct. 10, 1961

3,004,077
MANUFACTURE OF FLUORINATED AROMATIC COMPOUNDS
Ronald Eric Banks, Burnage, Manchester, Anthony Kenneth Barbour, Coombe Dingle, Bristol, Colin Russell Patrick, Quinton, Birmingham, and John Colin Tatlow, Kings Norton, Birmingham, England, assignors to National Research Development Corporation, London, England, a British corporation
No Drawing. Filed Sept. 4, 1959, Ser. No. 838,055
Claims priority, application Great Britain Sept. 11, 1958
10 Claims. (Cl. 260—650)

The present invention relates to the manufacture of nuclear fluorinated aromatic compounds.

The invention is particularly applicable to the production of highly fluorinated hydrocarbons of the benzene series (such as hexafluorobenzene, pentafluorobenzene and tetrafluorobenzene) and provides a new and convenient route for the preparation of these compounds.

It has now been discovered that fluorinated cyclohexadienes may be defluorinated to yield nuclear fluorinated aromatic compounds.

In accordance with the invention, nuclear fluorinated aromatic compounds are made by contacting a fluorocyclohexadiene with a clean reactive surface of a metal such as nickel, stainless steel, iron or copper in the massive form, or in the form of gauze, chips, wool or powder to give a large area of surface, at a temperature of preferably within the range 300°–700° C. With continued use the metal surface takes up fluorine and becomes coated with an impervious layer of metallic fluoride. It is then less efficient for defluorination but may be restored to high activity by passage of a reducing agent such as hydrogen at a temperature of more than 300° C.

For a given cyclohexadiene, conditions may be found for which the products consist largely of one highly fluorinated aromatic compound; there being the possibility of the formation of alternative aromatic products by such processes as isomerisation, and dehydrofluorination in cases where the starting cyclohexadiene contains hydrogen.

The reaction conditions which have been found to affect the product are the temperature of the reaction, the duration of the reaction and, for starting fluorinated cyclohexadienes containing hydrogen, the rapidity with which the cyclohexadiene is brought to the reaction temperature. The isomeric octafluorocyclohexadienes give hexafluorobenzene in high yield when the reaction temperature is between about 350° and 450° C. and when the starting fluorinated cyclohexadiene contains hydrogen it should be brought rapidly to the reaction temperature in order to reduce the extent of dehydrofluorination reactions. The hexafluorocyclohexadienes give tetrafluorobenzenes as the major product together with some pentafluorobenzene and the heptafluorocyclohexadienes give largely pentafluorobenzene together with some hexafluorobenzene. By the invention also, perfluoro-alkyl aromatic compounds may be prepared from perfluoro-alkylated nuclear fluorinated cyclohexadienes, for example, trifluoromethylpentafluorobenzene (octafluorotoluene) may be obtained from trifluoromethylheptafluorocyclohexadienes.

The defluorination reaction time or contact time should be between about 10 to 30 minutes. For the conversion of an octafluorocyclohexadiene to hexafluorobenzene for example, the optimum contact time is between 15 and 20 minutes. The metal surface in any case, as previously described, becomes considerably deactivated over longer periods so that a long term process is carried out in a series of cycles in which a defluorination period is followed by reactivation of the metal surface by hydrogen, the reaction being maintained at a given temperature of at least 300° C. throughout and each complete cycle lasting for the order of half an hour.

Various examples of the preparation of polyfluorobenzenes in accordance with the invention will now be described.

The processes described in Examples 1 to 3 were carried out in a tubular reactor constructed of mild steel, diameter 1", length 1' 6", part of which was contained in an electrically heated furnace, length 12", whose central zone was at the temperature specified as the temperature of the reaction. The starting materials were introduced directly as liquids into the reactor. The products were collected in metal receivers cooled by means of solid carbon dioxide and were analysed by gas chromatography.

*Example 1*

Octafluorocyclohexa-1:4-diene (7.8 parts) was passed at the rate of 5.2 g. per hour through the mild steel reactor heated to 500° C. The product (6.2 parts) contained by weight hexafluorobenzene (72%), decafluorocyclohexene (9%), octafluorocyclohexa-1:3-diene (6%) and unchanged starting material (13%).

*Example 2*

Octafluorocyclohexa-1:4-diene (21 parts) was passed at the rate of 12 g. per hour through the mild steel reactor heated to 500° C. The product (17.2 parts) contained by weight hexafluorobenzene (55%), decafluorocyclohexene (6%), octafluorocyclohexa-1:3-diene (12%) and unchanged starting material (27%).

*Example 3*

Octafluorocyclohexa-1:4-diene (35.8 parts) was passed at the rate of 5.2 g. per hour through the mild steel reactor heated to 410° C. The product (29 parts) contained by weight hexafluorobenzene (36%), decafluorocyclohexene (15%), octafluorocyclohexa - 1:3 - diene (13%) and unchanged starting material (36%).

*Example 4*

Octafluorocyclohexa-1:4-diene (5 parts) was heated to 540° C. for 2 hours 50 minutes in a nickel autoclave, 1" diameter and 1' 6" in length, packed with mild steel tubes. At the end of the period, the organic contents of the autoclave were transferred in vacuo to cooled receivers, weighed and analysed by gas chromatography. The product (4.2 parts) contained by weight hexafluorobenzene (40%), decafluorocyclohexene (1%), octafluorocyclohexa-1:3-diene (13%) and unchanged starting material (46%).

The reactions described in Examples 5 to 7 were carried out in a nickel tube, of diameter 1", and of length 2' 6", part of which was contained in a furnace of length 1' 6", whose central zone, about 4–5" in length, as at the temperature measured and specified as the temperature of the reaction. The tube was packed with such materials as steel wool, nickel gauze, or with nickel or stainless steel Dixon gauzes. The starting material was introduced into a heated glass tube outside the furnace, there volatilized, and passed into the nickel tube in a stream of nitrogen at a flow rate of about one to two litres/hour. The reaction products were condensed in a tube immersed in liquid air, and were examined and separated by means of gas chromatography using a thermal conductivity cell as detector.

Identification of the product was confirmed by using infra-red spectrometry.

The reactions described in Examples 8 to 11 were carried out in a similar manner but in a larger nickel tube of diameter 2½" and length 4 ft. packed with iron gauze.

Example 5

A mixture of octafluorocyclohexa-1:3-and -1:4-dienes (19.2 parts) was passed through the nickel tube packed with nickel Dixon gauzes at 630–660° C. in aliquots of 4.8 parts. After passage of each aliquot of the mixture the metal was regenerated by passage of hydrogen for 15 minutes at 5 litres/hour. The products were collected in bulk and separated by large scale gas chromatography to give hexafluorobenzene (13.7 parts).

Example 6

1H-heptafluorocyclohexa-1:3-diene (2.8 parts) was passed through the nickel tube packed with stainless steel Dixon gauzes at 600° C. at a flow rate of 2 litres/hour. Analysis of the product (2.1 parts) showed that it contained by weight pentafluorobenzene (about 80%) and hexafluorobenzene (about 10%).

Example 7

1H:5H-hexafluorocyclohexa-1:4-diene (3 parts) was passed through the nickel tube packed with nickel gauze at 450° C. The product (2.2 parts) was separated gas chromatographically to give a mixture (1.8 parts) (irresolvable on the packing of the chromatography column) of pentafluorobenzene and 1:2:3:5-tetrafluorobenzene. This was shown by means of infra-red spectroscopy to contain 80% of the tetrafluorobenzene.

Example 8

A mixture of 1H:2H-hexafluorocyclohexa-1:3- and -1:4-dienes (8 parts) was passed through the 2½″ diameter nickel tube at 450° C. in a stream of nitrogen. The product (5.3 parts) was separated to yield pentafluorobenzene (1.4 parts) and 1:2:3:4-tetrafluorobenzene (1.5 parts).

Example 9

A mixture of octafluorocyclohexa-1:3- and -1:4-dienes (48 parts) was passed through the 2½″ diameter nickel tube in a nitrogen stream at 450° C. hexafluorobenzene (38 parts) was obtained.

Example 10

A mixture of 1H-heptafluorocyclohexa-1:3- and -1:4-dienes and 2H-heptafluorocyclohexa-1:3-diene (16 parts) was passed through the reactor in a nitrogen stream flowing at a rate of about four litres/hour. The main part of the reactor was maintained at 460° C. and when the inlet end of the reactor was at a temperature of 120° C., 345° C. and 460° C. the total product recovered and hexafluorobenzene and pentafluorobenzene obtained was respectively 12.6 parts, 5.1 parts and 5.1 parts at 120° C.; 13.5 parts, 6.8 parts and 3.2 parts at 345° C.; and 10.7 parts, 1.8 parts and 6.1 parts at 460° C.

Example 11

A series of experiments were carried out in the 2½″ nickel tube packed with about 40 sq. ft. of 50 mesh iron gauze with a starting mixture of the isomeric octafluorocyclohexadienes as starting material. The following table shows the results which indicate that the optimum temperature for the reaction is between about 400° and 450° C. with a reaction time of the order of 20 minutes.

| Reaction Temperature, ° C. | Contact Time, Minutes | Percentage Yield Hexafluorobenzene |
|---|---|---|
| 250 | 28 | 9 |
| 350 | 23 | 76 |
| 400 | 18 | 78 |
| 425 | 17 | 76 |
| 430 | 18 | 84 |
| 440 | 22 | 83 |
| 450 | 17 | 73 |
| 480 | 16 | 44 |
| 500 | 14 | 32 |
| 520 | 13 | 29 |

The percentage yields of hexafluorobenzene are related to the input material less other useful organic materials recovered from the output.

We claim:

1. A process for the manufacture of a nuclear fluorinated aromatic compound in which a fluorinated cyclohexadiene is heated to a temperature of at least about 300° C. in contact with a metal surface reactive with fluorine.

2. A process according to claim 1 in which the metal surface is selected from the group consisting of copper, nickel, iron and steel.

3. A process for the manufacture of a highly fluorinated aromatic compound of the benzene series in which a corresponding fluorinated cyclohexadiene is heated to a temperature of at least about 300° C. in contact with a metal surface reactive with fluorine.

4. A process for the manufacture of hexafluorobenzene in which octafluorocyclohexadiene is heated to a temperature of at least about 300° C. in contact with a metal surface reactive with fluorine and hexafluorobenzene is separated from the reaction product.

5. A process for the manufacture of hexafluorobenzene in which octafluorocyclohexadiene is heated to a temperature between about 350° and 450° C. in contact with a metal surface reactive with fluorine.

6. A process for the manufacture of hexafluorobenzene in which octafluorocyclohexadiene is heated to a temperature between about 400° and 450° C. in contact with a metal surface reactive with fluorine for the order of ten to thirty minutes.

7. A process for the manufacture of pentafluorobenzene in which heptafluorocyclohexadiene is heated to a temperature of at least 300° C. in contact with a metal surface reactive with fluorine.

8. A process for the manufacture of a tetrafluorobenzene in which a hexafluorocyclohexadiene is heated to a temperature of at least 300° C. in contact with a metal surface reactive with fluorine.

9. A process for the manufacture of a nuclear fluorinated aromatic compound in which a corresponding fluorinated cyclohexadiene containing hydrogen is rapidly heated in contact with a metal surface reactive with fluorine to a reaction temperature of at least 300° C. at which it is maintained.

10. A process according to claim 1 in which the reactive metal surface is reactivated by passing hydrogen gas over it at an elevated temperature.

References Cited in the file of this patent

FOREIGN PATENTS 955,816     France _____ Jan. 19, 1950

OTHER REFERENCES

Godsell et al.: Nature 178, pp. 199–200 (1956).